(12) United States Patent
Jampani et al.

(10) Patent No.: US 10,789,678 B2
(45) Date of Patent: Sep. 29, 2020

(54) SUPERPIXEL SAMPLING NETWORKS

(71) Applicant: NVIDIA Corp., Santa Clara, CA (US)

(72) Inventors: Varun Jampani, Nashua, NH (US); Deqing Sun, Providence, RI (US); Ming-Yu Liu, San Jose, CA (US); Jan Kautz, Lexington, MA (US)

(73) Assignee: NVIDIA Corp., Santa Clara, CA (US)

( * ) Notice: Subject to any disclaimer, the term of this patent is extended or adjusted under 35 U.S.C. 154(b) by 91 days.

(21) Appl. No.: 16/130,871

(22) Filed: Sep. 13, 2018

(65) Prior Publication Data

US 2019/0340728 A1    Nov. 7, 2019

Related U.S. Application Data

(60) Provisional application No. 62/665,325, filed on May 1, 2018.

(51) Int. Cl.
| | | |
|---|---|---|
| *G06T 3/40* | (2006.01) | |
| *G06T 7/10* | (2017.01) | |
| *G06K 9/62* | (2006.01) | |
| *G06N 3/08* | (2006.01) | |

(52) U.S. Cl.
CPC .......... *G06T 3/4046* (2013.01); *G06K 9/6218* (2013.01); *G06N 3/08* (2013.01); *G06T 3/4007* (2013.01); *G06T 7/10* (2017.01); *G06T 2207/20081* (2013.01)

(58) Field of Classification Search
CPC ....... G06T 3/4046; G06T 7/10; G06T 3/4007; G06T 2207/20081; G06K 9/6218; G06N 3/08
USPC ........................................................ 382/256
See application file for complete search history.

(56) References Cited

U.S. PATENT DOCUMENTS

| | | | | |
|---|---|---|---|---|
| 5,748,329 A | * | 5/1998 | Chang ................. | H04N 1/6033 358/504 |
| 2015/0262367 A1 | * | 9/2015 | Doppler ................ | G06T 7/187 382/164 |
| 2018/0260668 A1 | * | 9/2018 | Shen ...................... | G06T 11/00 |

OTHER PUBLICATIONS

4. Wenlin Chen, Learning with Scalability and Compactness, May 2016, Washington University Open Scholarship. (Year: 2016).*

* cited by examiner

*Primary Examiner* — Wednel Cadeau
(74) *Attorney, Agent, or Firm* — Rowan TELS LLC

(57) ABSTRACT

A superpixel sampling network utilizes a neural network coupled to a differentiable simple linear iterative clustering component to determine pixel-superpixel associations from a set of pixel features output by the neural network. The superpixel sampling network computes updated superpixel centers and final pixel-superpixel associations over a number of iterations.

20 Claims, 5 Drawing Sheets

SUPERPIXEL SAMPLING NETWORKS

CROSS-REFERENCE TO RELATED APPLICATIONS

This application claims priority and benefit under 35 U.S.C. 119(e) to U.S. Application Ser. No. 62/665,325, filed on May 1, 2018, the contents of which are incorporated herein by reference in their entirety.

BACKGROUND

Superpixels are an over-segmentation of an image that is formed by grouping image pixels based on low-level image properties. The superpixels provide a perceptually meaningful tessellation of image content, thereby reducing the number of image primitives for subsequent image processing. Owing to their representational and computational efficiency, superpixels have become an established low/mid-level image representation and are widely-used in computer vision algorithms, such as object detection, semantic segmentation, saliency estimation, optical flow estimation, depth estimation, tracking, etc. Superpixels are especially widely-used in traditional energy minimization frameworks, where lower numbers of image primitives reduce the optimization complexity.

Deep learning techniques have been adopted for a wide range of computer vision problems. With the exception of a few methods, superpixels are scarcely used in conjunction with modern deep networks. There are two main reasons for this: 1) the standard convolution operation, which forms the basis of most deep architectures, is usually defined over regular grid lattices and becomes inefficient when operating over irregular superpixel lattices; and 2) existing superpixel algorithms are non-differentiable, and thus utilizing superpixels in deep networks introduces non-differentiable modules in otherwise end-to-end trainable network architectures.

BRIEF SUMMARY

Disclosed herein are embodiments of a system to implement a deep differentiable algorithm for superpixel segmentation. A Simple Linear Iterative Clustering (SLIC) superpixel algorithm is transformed into a differentiable algorithm by relaxing the nearest neighbor constraints present in SLIC. This differentiable algorithm enables end-to-end training and permits utilization of deep networks for learning superpixels instead of using conventional hand-crafted features. The combination of a deep network with differentiable SLIC forms an end-to-end trainable superpixel algorithm, the superpixel sampling network (SSN).

The SSN has the following properties in comparison to conventional superpixel algorithms:
 1. End-to-end trainable: SSNs are end-to-end trainable and may be efficiently integrated into other deep network architectures.
 2. Flexible and task-specific: SSN enables learning with flexible loss functions resulting in the learning of task-specific superpixels.
 3. State-of-the-art performance: SSN may outperform conventional superpixel algorithms on many types of datasets, enabling a machine or computer to more efficiently operate while determining superpixels.
 4. Favorable runtime: SSN also has more efficient runtimes compared to conventional superpixel algorithms, thus enabling learning on large datasets and higher efficiency on many practical applications.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
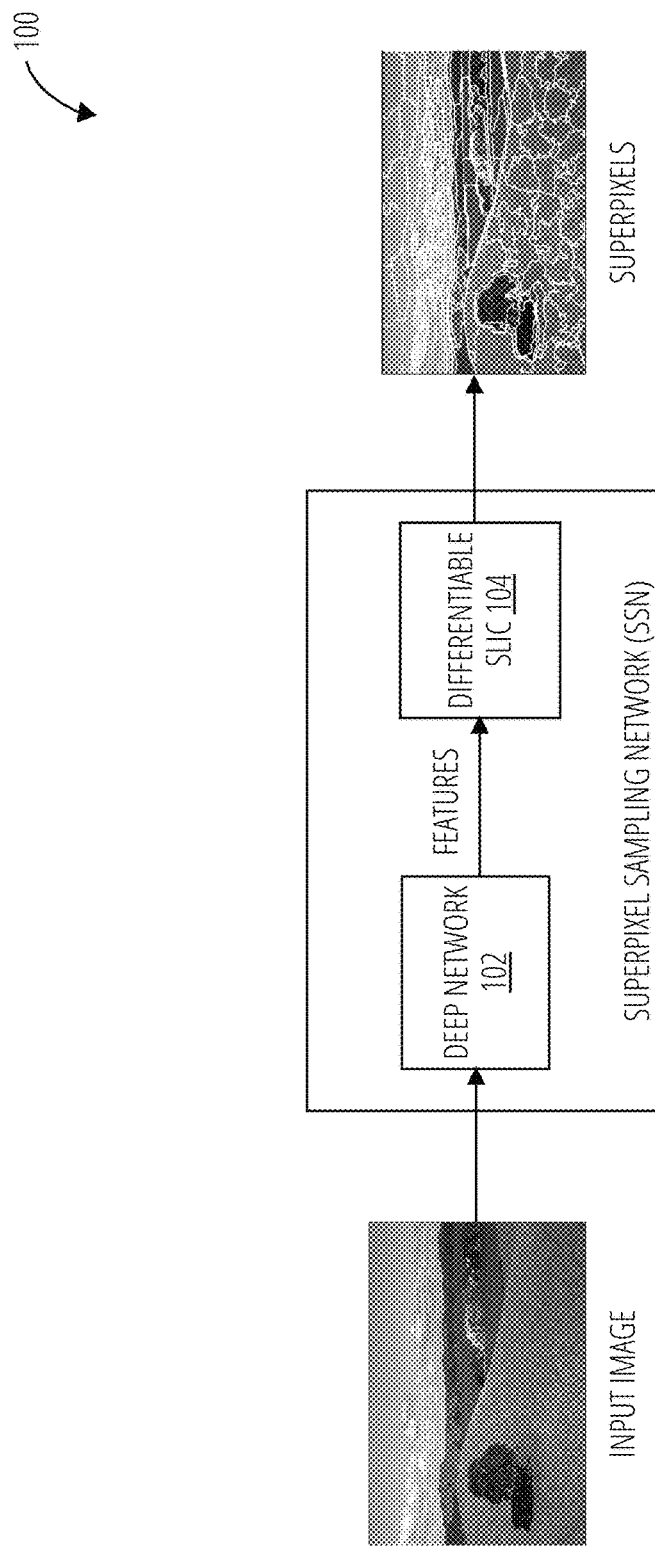
FIG. 1 illustrates an embodiment of a superpixel sampling network 100.

Terminology used herein should be afforded its conventional meaning in the arts unless otherwise indicated expressly or by implication.

"Differentiable algorithm" refers to an algorithm with computational components that are all continuous and differentiable.

"Nearest neighbor" refers to a distance limit for items belonging to a same cluster/neighborhood.

"End-to-end training" refers to a network that learns from the sampled dataset without supervised (manual) intervention.

"Deep network" refers to a neural network with more than one hidden layer.

A superpixel sampling network (SSN) is disclosed that utilizes a differentiable linear clustering technique that improves on conventional non-differentiable SLIC superpixel algorithms. Although there are several different variants of the SLIC algorithm, in the original form, the SLIC is a k-means clustering performed on image pixels in a five-dimensional position and color space (usually scaled XY Lab space). Formally, given an image $I \in R^{n \times 5}$ with 5-dimensional KY Lab features at n pixels, the task of superpixel computation is to assign each pixel to one of the in superpixels, that is, to compute the pixel-superpixel association map, $H \in \{0,1,\ldots,m-1\}$. The SLIC algorithm then operates as follows. First, initial cluster (superpixel) centers are sampled, $S^0 \in R^{m \times 5}$, in the 5-dimensional space. The sampling may be done uniformly across the pixel grid with some local perturbations based on image gradients. Given these initial superpixel centers SO, the SLIC algorithm proceeds in an iterative manner with the following two steps in each iteration t:

1. Pixel-Superpixel association: Associate each pixel to the nearest superpixel center in the five-dimensional space, i.e., compute the new superpixel assignment at each pixel p, $$H_p^t = \underset{i \in \{0,\ldots,m-1\}}{\operatorname{argmin}} D(I_p, S_i^{t-1}) \quad \text{Equation 1}$$

where D denotes the distance computation, $D(a,b)=\|a-b\|^2$.

2. Superpixel center update: Average pixel features (XY Lab) inside each superpixel cluster to obtain new superpixel cluster centers $S^t$. For each superpixel i, the centroid of that cluster is computed, $$S_i^t = \frac{1}{Z_i^t} \sum_{p|H_p^t=i} I_p \qquad \text{Equation 2}$$

where $Z_i^t$ denotes the number of pixels in the superpixel cluster i.

The pixel-superpixel association and the superpixel center update are repeated until either convergence or for a fixed number of iterations. Because computing the distance D in Equation 1 between all the pixels and superpixels is time-consuming, that computation may be constrained to a fixed neighborhood around each superpixel center. At the end, depending on the application, there may be an additional step to enforce spatial connectivity across pixels in each superpixel cluster.

The computations in SLIC show that the non-differentiability arises due to the computation of pixel-superpixel associations, which involves a non-differentiable nearest neighbor operation. This nearest neighbor computation forms the core of the SLIC superpixel clustering and, thus, it is difficult to avoid this operation.

The nearest-neighbor operation is converted into a differentiable operation. Instead of computing hard pixel-superpixel associations, $H \in \{0, 1, \ldots, m-1\}^{n \times 1}$ (utilizing Equation 1), soft associations $Q \in R^{n \times m}$ between pixels and superpixels are computed. Specifically, for a pixel p and superpixel i at iteration t, the nearest-neighbor computation (Equation 1) in SLIC is replaced with the following pixel-superpixel association:

$$Q_{pi}^t = e^{-D(I_p, S_i^{t-1})} = e^{-\|I_p - S_i^{t-1}\|^2} \qquad \text{Equation 3}$$

The computation of new superpixels cluster centers (Equation 2) is replaced with the weighted sum of pixel features, $$S_i^t = \frac{1}{Z_i^t} \sum_{p=1}^n Q_{pi}^t I_p \qquad \text{Equation 4}$$

where $Z_i^t = \Sigma_p Q_{pi}^t$ is the normalization constant. The column normalized $\hat{Q}^t$ may be referred to as $Q^t$ and, thus, the superpixel center update is $S^t = Q^{tT}I$. The size of is $n \times m$ and even for a small number of superpixels m, may be inefficient o compute $O_{pi}$ between all the pixels and superpixels. Therefore, the distance computations from each pixel may be limited to only the nine (9) surrounding superpixels. For each pixel in a specific superpixel, only the surrounding superpixels are considered for computing the association. This reduces the size of Q from $n \times m$ to $n \times 9$, making it efficient in terms of both computation and memory. Now, both the computations in each SLIC iteration are differentiable, and this modified algorithm is differentiable SLIC. As this new superpixel algorithm is differentiable, it may be integrated into deep network architectures. Instead of using manually-designed pixel features $I_p$, deep feature extractors are utilized and the whole network is trained end-to-end. The image features $I_p$, in the above computations (Equations 3 and 4) are replaced with k dimensional pixel features $F_p \in R^{n \times k}$ computed using a deep network. The coupling of deep networks with the differentiable SUC is the superpixel sampling network (SSN).

As depicted in FIG. 1, the superpixel sampling network 100 is composed of two parts: a deep network 102 that generates features at each pixel, which are then passed on to a differentiable SLIC 104 for superpixel extraction.

A given input image is first passed through the deep network 102 to produce features at each pixel. These deep features are then passed onto the differentiable SLIC 104, which performs iterative clustering, resulting in the desired superpixels. The superpixel sampling network 100 is end-to-end trainable. The differentiable nature of the superpixel sampling network 100 permits the utilization of flexible loss functions for learning task-specific superpixels. The superpixel sampling network 100 may be utilized with semantic segmentation networks that utilize superpixels and with vision tasks, such as determining superpixels that better align with optical flow boundaries rather than standard object boundaries.

Figure 2:
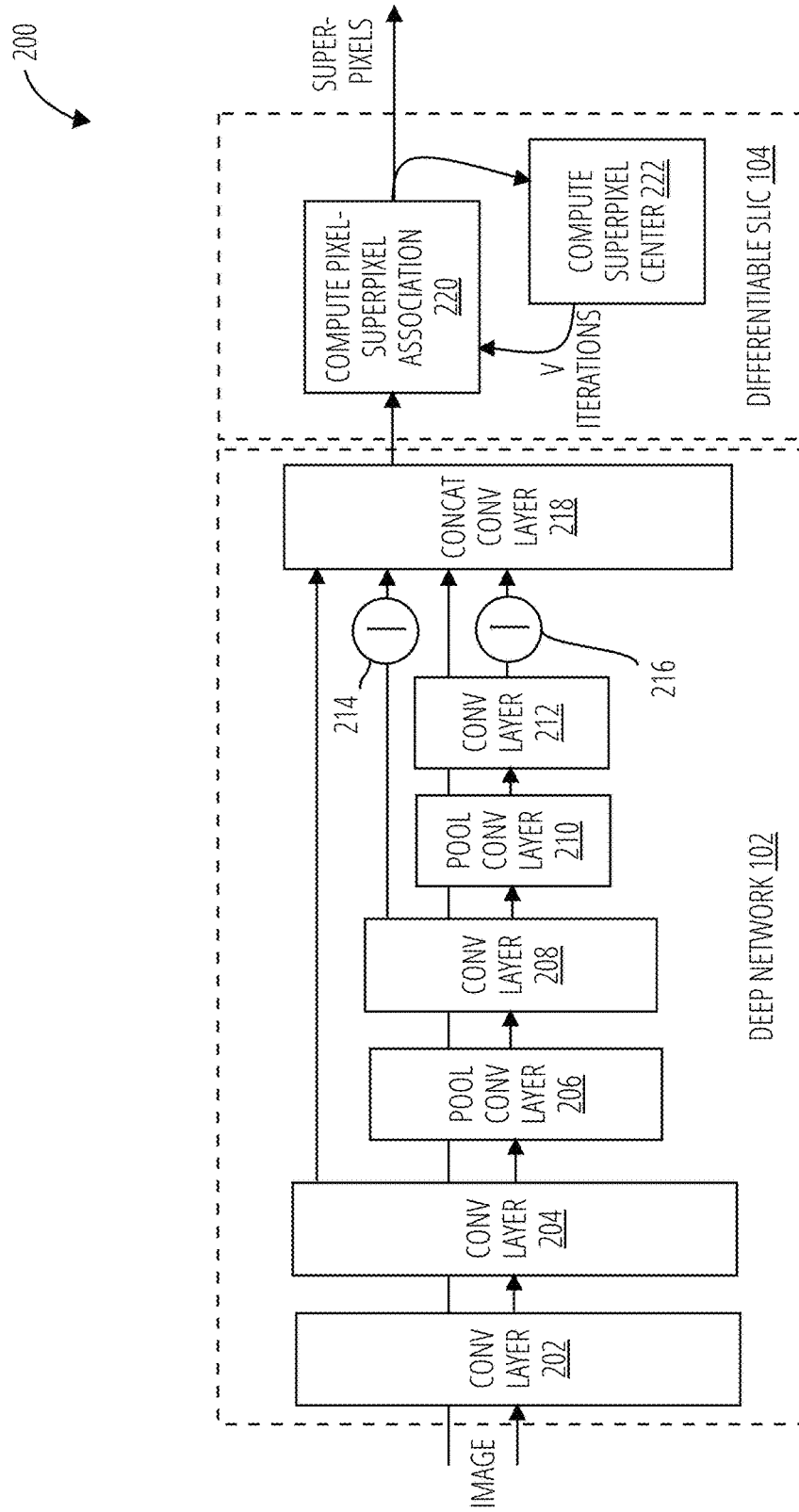
FIG. 2 illustrates an embodiment of a superpixel sampling network 200.

Referring to FIG. 2, a superpixel sampling network 200 includes a deep network 102 further comprising a convolution layer 202, a convolution layer 204, a convolution layer 206, a convolution layer 208, a convolution layer 210, a convolution layer 212, a bilinear upsampler 214, a bilinear upsampler 216, and a convolution layer 218 and a differentiable SLIC 104 further comprising a pixel-superpixel associator 220 and a superpixel center calculator 222. The superpixel sampling network 200 may be operated in accordance with the process depicted in FIG. 3.

The deep network 102 is a convolution neural network (CNN) with one or more convolution layers. Each of the convolution layers are interleaved with Batch Norm (BN) and rectified linear unit (ReLU) nonlinearities. The features from the deep network 102 are then passed onto iterative updates in differentiable SLIC to generate superpixels. The convolution layer 202, the convolution layer 204, the convolution layer 208, the convolution layer 212, and the convolution layer 218 perform convolution on the inputs. The convolution layer 206 and the convolution layer 210 utilize max-pooling, which downsamples the input signal by a factor of 2, after the convolution layer 204 and the convolution layer 208, respectively, to increase the receptive field of the network. The bilinear upsampler 214 and the bilinear upsampler 216 are utilized to bilinearly upsample the outputs of the convolution layer 208 and the convolution layer 212, respectively. The convolution layer 218 concatenates the outputs of the convolution layer 204, the bilinear upsampler 214, and the bilinear upsampler 216 and performs the final convolution. Each of the convolution layers may be composed of 3×3 filters with the number of output channels set to 64, except for the convolution layer 218, which may output k−5 channels. This output of k−5 channels is concatenated with the XY Lab (x,y,r,g,b) of the given image resulting in k-dimensional features at each pixel. The resulting k dimensional pixel features are passed onto the pixel-superpixel associator 220 and the superpixel center calculator 222 that iteratively updates pixel-superpixel associations and superpixel centers for v iterations. The number of iterations, v, may be a pre-determined number or be based on a convergence of the superpixels within a threshold value or with a previous iteration, such as the immediately previous. The superpixel sampling network 200 is end-to-end trainable.

The end-to-end trainable superpixel sampling network 200 may utilize flexible loss functions, which may learn task-specific superpixels. The superpixel sampling network

200 may be coupled with any task-specific loss function resulting in the learning of superpixels that are optimized for downstream computer vision tasks. The superpixel sampling network 200 may learn superpixels that may efficiently represent a scene characteristic, such as semantic labels, optical flow, depth, etc. As an example, if there is a downstream semantic segmentation task, the produced superpixels may adhere to semantic boundaries. To optimize for representational efficiency, a combination of a task-specific reconstruction loss and a compactness loss may be utilized.

The pixel properties (e.g., semantic labels or optical flow values) are represented as $R \in \mathbb{R}^{n \times l}$. For instance, R can be semantic label or optical flow maps. R may be utilized during training for the superpixel sampling network 200 to learn to predict superpixels suitable to represent R. As mentioned previously, the pixel properties may be mapped onto superpixels using the column-normalized association matrix $\hat{Q}$, $R^v = \hat{Q}^T R$, where $R^v \in \mathbb{R}^{v \times l}$. The resulting superpixel representation $R^v$ is then mapped back onto pixel representation using row-normalized association matrix $\tilde{Q}$, $R^* = \tilde{Q} S$, where $R^* \in \mathbb{R}^{n \times l}$. Then the reconstruction loss is given as $$L_{recon} = \mathcal{L}(R, R^*) = \mathcal{L}(R, \tilde{Q}\hat{Q}^T R) \quad \text{Equation 5}$$

where L denotes a task-specific loss-function. For segmentation tasks, cross-entropy loss is utilized for L and utilized L1-norm for learning superpixels for optical flow. Here, Q denotes the association matrix $Q^v$ after the final iteration of differentiable SLIC.

In addition to optimizing the representational efficiency, a compactness loss may also be utilized to influence the superpixels to be spatially compact, that is to have lower spatial variance inside each superpixel cluster. $I^{xy}$ denotes positional pixel features. These positional features are mapped into the superpixel representation, $S^{xy} = \hat{Q}^T I^{xy}$. Then, the inverse mapping onto the pixel representation is performed utilizing the hard associations H, instead of soft associations Q, by assigning the same superpixel positional feature to all the pixels belonging to that superpixel, $I^{xy}_p = S^{xy}_i | H_p = i$. The compactness loss is defined as the following L2 norm:

$$L_{compact} = \|I^{xy} - \overline{I}^{xy}\|^2 \quad \text{Equation 6}$$

This loss influences superpixels to have a lower variance in positional features. However, compactness loss in not differentiable with respect to H due to hard-assignments, but is differentiable with respect to superpixel features $S^{xy}$ and, thus, may still be utilized with the deep network 102. The flexibility of the superpixel sampling network 200 enables the utilization of many other loss functions. The overall loss may be a combination of these two loss functions, $L = L_{recon} + \lambda L_{compact}$. The value of the ratio, $\lambda$, may be set to $10^{-5}$.

The differentiable SLIC 104 may be implemented as neural network layers utilizing CUDA in the Caffe neural network framework. Scaled XY Lab positional and color features may be utilized as input to the superpixel sampling network 200, with position and color feature scales represented as $\gamma_{pos}$ and $\gamma_{color}$, respectively. The value of $\gamma_{color}$ is independent of the number of superpixels and is set to 0.26 with color values ranging between 0 and 255. The value of $\gamma_{pos}$ may depend on the number of superpixels, $\gamma_{pos} = \eta \max(m_w/n_w, m_h/n_h)$, where $m_w$, $n_w$ and $m_h$, $n_h$ denote the number of superpixels and pixels along the image width and height respectively. The value of 2 may be utilized for $\eta$.

During training, image patches of size 201×201 and 100 superpixels may be utilized. In terms of data augmentation, left-right flips and random scaling of image patches may be utilized. Adam stochastic optimization with a batch size of 8 and a learning rate of 0.0001 may be utilized. The models may be trained for 500K iterations and the final trained models are selected based on validation accuracy. For ablation studies, the models may be trained with varying parameters for 200K iterations. 5 iterations (v=5) of differentiable SLIC 104 was utilized for training and 10 iterations was utilized while testing.

Figure 3:
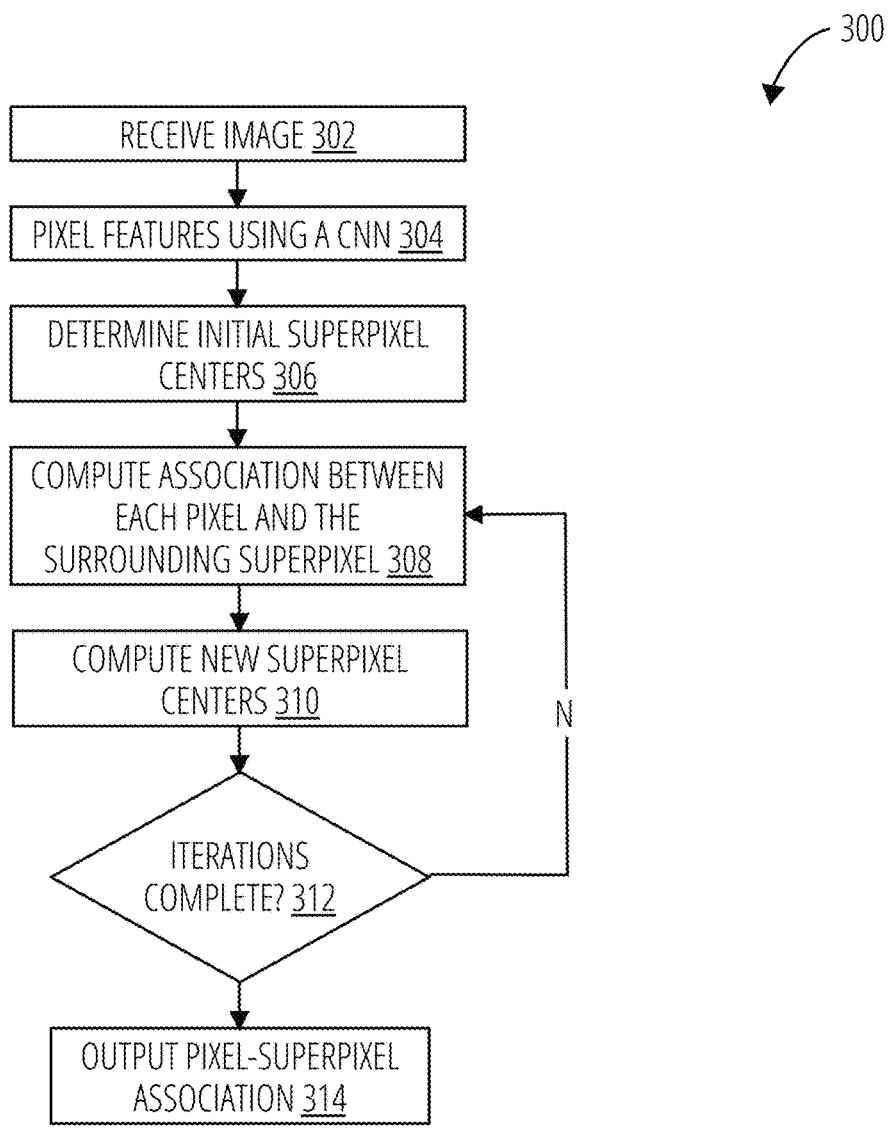
FIG. 3 illustrates an embodiment of a superpixelation method 300.

Referring to FIG. 3, a superpixelation method 300 starts by receiving images (block 302). Deep image feature extraction is then performed utilizing a CNN (block 304). The superpixel cluster centers are initialized (block 306). The initial centers may be the average pixels features in an initial regular superpixel grid. Then, for v iterations, pixel-superpixel associations (block 308) and superpixel centers (block 310) are updated. Once a number of iterations are performed (decision block 312), the final pixel-superpixel association is output (block 314). The number of iterations may be predetermined and received by the superpixelation method 300 or the number of iterations may be determined by the superpixelation method 300 by a convergence of the pixel-superpixel association, such as by comparing the difference of the current iteration to the previous iteration to a threshold. Although soft pixel-superpixel associations Q may be utilized, the soft associations may be converted to hard associations, H. In addition, spatial connectivity may be enforced across pixels inside each superpixel cluster. This may be accomplished by merging the superpixels smaller than certain threshold with the surrounding ones and then assigning a different cluster ID for each spatially-connected component.

For some downstream applications that utilize superpixels, the pixel representations are mapped onto superpixel representations and vice versa. With the conventional superpixel algorithms, which provide hard clusters, this mapping from pixel to superpixel representations is done via averaging inside each cluster (see Equation 2 above). The inverse mapping from superpixel to pixel representations is done by assigning the same superpixel feature to all the pixels belonging to that superpixel. The same pixel-superpixel mappings may be utilized with the SSN superpixeis as well, using the hard clusters obtained from the SSN. The soft pixel-superpixel associations generated by the SSN may also be utilized for mapping between pixel and superpixel representations. Equation 4 already describes the mapping from a pixel to superpixel representation which is a simple matrix multiplication with the transpose of column-normalized Q matrix: $S = Q\hat{w}^T F$ here F and S denote pixel and superpixel representations respectively. The inverse mapping from superpixel to pixel representation is done by multiplying the row-normalized Q, denoted as $\tilde{Q}$ with the superpixel representations, $F = \tilde{Q} S$. Thus, the mappings between pixel and superpixel representations are given as simple matrix multiplications with t association matrix and are differentiable.

Figure 4:
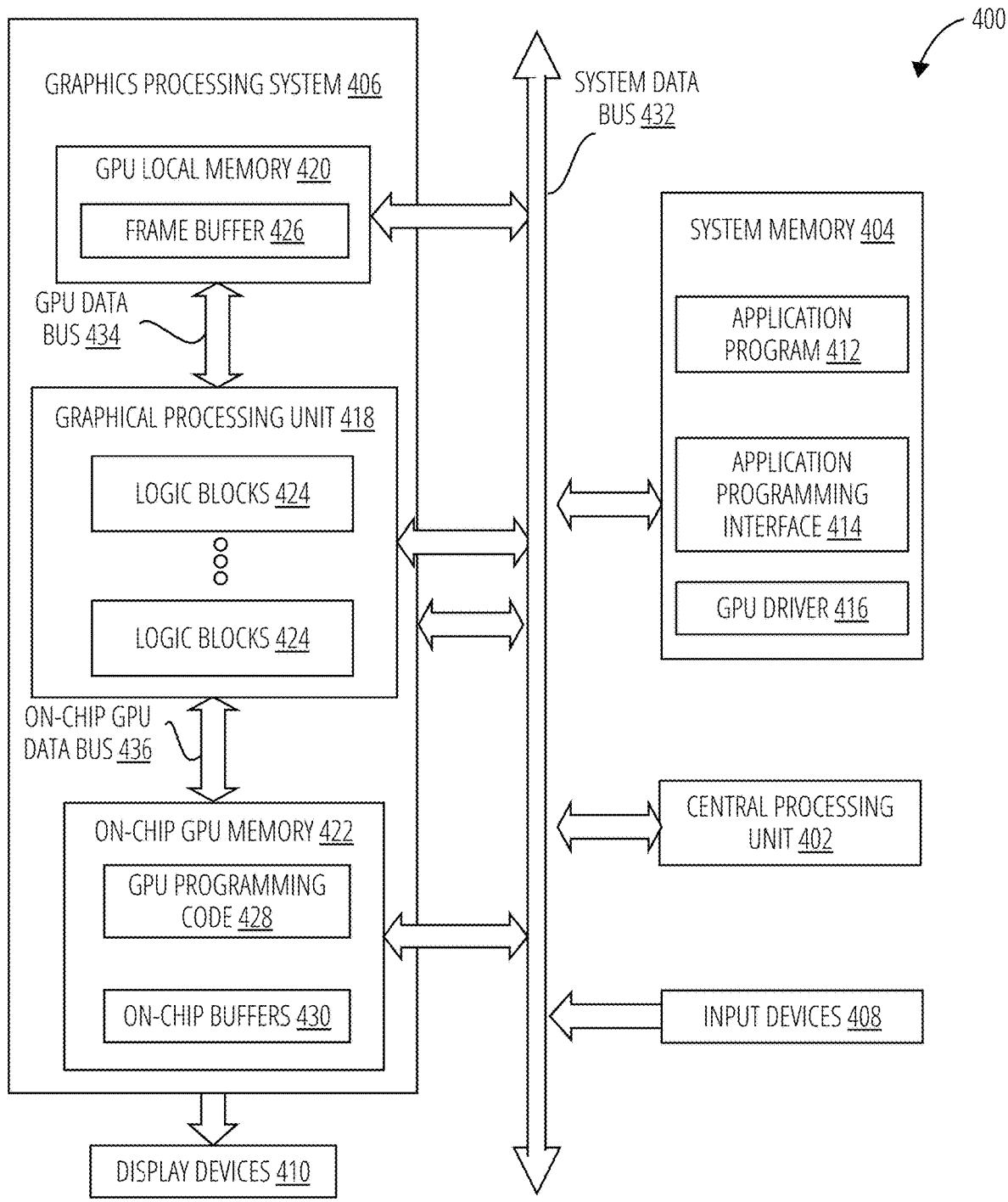
FIG. 4 is a block diagram of a computing system 400 within which the techniques introduced herein may be embodied or carried out.

FIG. 4 is a block diagram of one embodiment of a computing system 400 in which one or more aspects of the invention may be implemented. The computing system 400 includes a system data bus 432, a CPU 402, input devices 408, a system memory 404, a graphics processing system 406, and display devices 410. In alternate embodiments, the CPU 402, portions of the graphics processing system 406, the system data bus 432, or any combination thereof, may be integrated into a single processing unit. Further, the functionality of the graphics processing system 406 may be included in a chipset or in some other type of special purpose processing unit or co-processor.

As shown, the system data bus 432 connects the CPU 402, the input devices 408, the system memory 404, and the graphics processing system 406. In alternate embodiments, the system memory 404 may connect directly to the CPU 402. The CPU 402 receives user input from the input devices 408, executes programming instructions stored in the system memory 404, operates on data stored in the system memory 404 to perform computational tasks. The system memory 404 typically includes dynamic random-access memory (DRAM) employed to store programming instructions and data. The graphics processing system 406 receives instructions transmitted by the CPU 402 and processes the instructions to render and display graphics images on the display devices 410.

As also shown, the system memory 404 includes an application program 412, an API 414 (application programming interface), and a graphics processing unit driver 416 (GPU driver). The application program 412 generates calls to the API 414 to produce a desired set of computational results. For example, the application program 412 may transmit shading programs to the API 414 for processing within the graphics processing unit driver 416.

The graphics processing system 406 includes a GPU 418 (graphics processing unit), an on-chip GPU memory 422, an on-chip GPU data bus 436, a GPU local memory 420, and a GPU data bus 434. The GPU 418 is configured to communicate with the on-chip GPU memory 422 via the on-chip GPU data bus 436 and with the GPU local memory 420 via the GPU data bus 434. The GPU 418 may receive instructions transmitted by the CPU 402, process the instructions, and store results in the GPU local memory 420. Subsequently, the GPU 418 may display certain graphics images stored in the GPU local memory 420 on the display devices 410.

The GPU 418 includes one or more logic blocks 424. The logic blocks 424 may implement embodiments of the super-pixelation techniques described herein.

The GPU 418 may be provided with any amount of on-chip GPU memory 422 and GPU local memory 420, including none, and may employ on-chip GPU memory 422, GPU local memory 420, and system memory 404 in any combination for memory operations.

The on-chip GPU memory 422 is configured to include GPU programming 428 and on-Chip Buffers 430. The GPU programming 428 may be transmitted from the graphics processing unit driver 416 to the on-chip GPU memory 422 via the system data bus 432. The GPU programming 428 may include the logic blocks 424.

The GPU local memory 420 typically includes less expensive off-chip dynamic random-access memory (DRAM) and is also employed to store data and programming employed by the GPU 418. As shown, the GPU local memory 420 includes a frame buffer 426. The frame buffer 426 may for example store data for example an image, e.g., a graphics surface, that may be employed to drive the display devices 410. The frame buffer 426 may include more than one surface so that the GPU 418 can render one surface while a second surface is employed to drive the display devices 410.

The display devices 410 are one or more output devices capable of emitting a visual image corresponding to an input data signal. For example, a display device may be built using a liquid crystal display, or any other suitable display system. The input data signals to the display devices 410 are typically generated by scanning out the contents of one or more frames of image data that is stored in the frame buffer 426.

Figure 5:
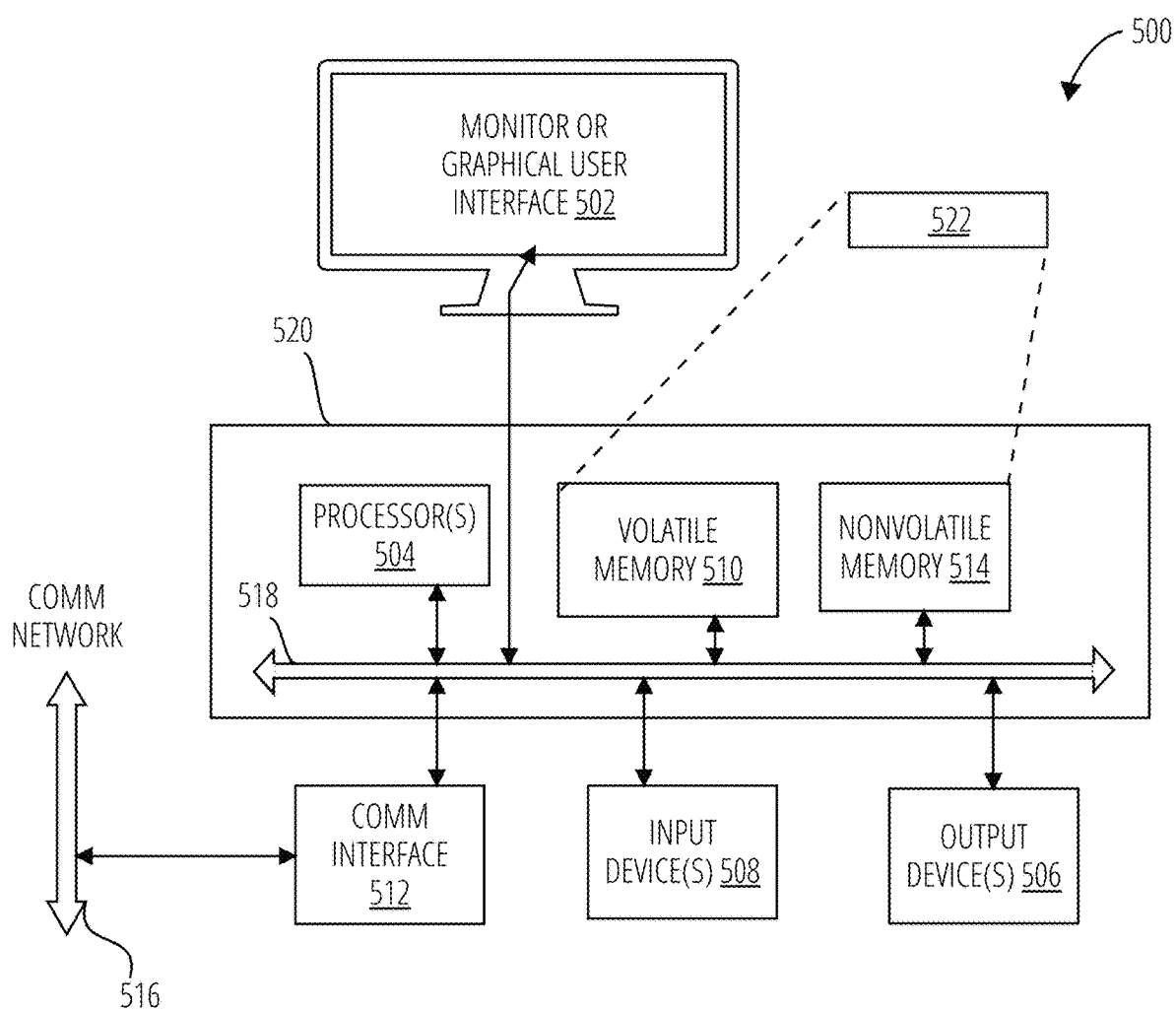
FIG. 5 is an example block diagram of a computing device 500 that may incorporate embodiments of the present invention.

FIG. 5 is an example block diagram of a computing device 500 that may incorporate embodiments of the present invention. FIG. 5 is merely illustrative of a machine system to carry out aspects of the technical processes described herein, and does not limit the scope of the claims. One of ordinary skill in the art would recognize other variations, modifications, and alternatives. In one embodiment, the computing device 500 typically includes a monitor or graphical user interface 502, a data processing system 520, a communication network interface 512, input device(s) 508, output device(s) 506, and the like.

As depicted in FIG. 5, the data processing system 520 may include one or more processor(s) 504 that communicate with a number of peripheral devices via a bus subsystem 518. These peripheral devices may include input device(s) 508, output device(s) 506, communication network interface 512, and a storage subsystem, such as a volatile memory 510 and a nonvolatile memory 514.

The volatile memory 510 and/or the nonvolatile memory 514 may store computer-executable instructions and thus forming logic 522 that when applied to and executed by the processor(s) 504 implement embodiments of the processes disclosed herein.

The input device(s) 508 include devices and mechanisms for inputting information to the data processing system 520. These may include a keyboard, a keypad, a touch screen incorporated into the monitor or graphical user interface 502, audio input devices such as voice recognition systems, microphones, and other types of input devices. In various embodiments, the input device(s) 508 may be embodied as a computer mouse, a trackball, a track pad, a joystick, wireless remote, drawing tablet, voice command system, eye tracking system, and the like. The input device(s) 508 typically allow a user to select objects, icons, control areas, text and the like that appear on the monitor or graphical user interface 502 via a command such as a click of a button or the like.

The output device(s) 506 include devices and mechanisms for outputting information from the data processing system 520. These may include the monitor or graphical user interface 502, speakers, printers, infrared LEDs, and so on as well understood in the art.

The communication network interface 512 provides an interface to communication networks (e.g., communication network 516) and devices external to the data processing system 520. The communication network interface 512 may serve as an interface for receiving data from and transmitting data to other systems. Embodiments of the communication network interface 512 may include an Ethernet interface, a modem (telephone, satellite, cable, ISDN), (asynchronous) digital subscriber line (DSL), FireWire, USB, a wireless communication interface such as Bluetooth or Wi-Fi, a near field communication wireless interface, a cellular interface, and the like.

The communication network interface 512 may be coupled to the communication network 516 via an antenna, a cable, or the like. In some embodiments, the communication network interface 512 may be physically integrated on a circuit board of the data processing system 520, or in some cases may be implemented in software or firmware, such as "soft modems", or the like.

The computing device 500 may include logic that enables communications over a network using protocols such as HTTP, TCP/IP, RTP/RTSP, IPX, UDP and the like.

The volatile memory 510 and the nonvolatile memory 514 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 510 and the nonvolatile memory 514 may be configured to store the basic programming and data constructs that provide the functionality of the disclosed processes and other embodiments thereof that fall within the scope of the present invention.

Logic 522 that implements embodiments of the present invention may be stored in the volatile memory 510 and/or the nonvolatile memory 514. Said logic 522 may be read from the volatile memory 510 and/or nonvolatile memory 514 and executed by the processor(s) 504. The volatile memory 510 and the nonvolatile memory 514 may also provide a repository for storing data used by the logic 522.

The volatile memory 510 and the nonvolatile memory 514 may include a number of memories including a main random-access memory (RAM) for storage of instructions and data during program execution and a read only memory (ROM) in which read-only non-transitory instructions are stored. The volatile memory 510 and the nonvolatile memory 514 may include a file storage subsystem providing persistent (non-volatile) storage for program and data files. The volatile memory 510 and the nonvolatile memory 514 may include removable storage systems, such as removable flash memory.

The bus subsystem 518 provides a mechanism for enabling the various components and subsystems of data processing system 520 communicate with each other as intended. Although the communication network interface 512 is depicted schematically as a single bus, some embodiments of the bus subsystem 518 may utilize multiple distinct busses.

It will be readily apparent to one of ordinary skill in the art that the computing device 500 may be a device such as a smartphone, a desktop computer, a laptop computer, a rack-mounted computer system, a computer server, or a tablet computer device. As commonly known in the art, the computing device 500 may be implemented as a collection of multiple networked computing devices. Further, the computing device 500 will typically include operating system logic (not illustrated) the types and nature of which are well known in the art.

Interpretation

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A superpixel sampling network comprising:
    a neural network to generate a set of pixel features from an image;
    a differentiable simple linear iterative clustering component coupled to receive the pixel features from the neural network;
    the differentiable simple linear iterative clustering component to:
        determine initial superpixel centers;
        determine pixel-superpixel associations as a differentiable exponential function of distance between the set of pixel features and the initial superpixel centers;
        determine updated superpixel centers; and
        wherein the differentiable simple linear iterative clustering component operates for a number of iterations, each iteration utilizing the updated superpixel centers to compute the pixel-superpixel associations, the differentiable simple linear iterative clustering component outputting the image with final pixel-superpixel associations.

2. The superpixel sampling network of claim 1, wherein the neural network and the differentiable simple linear iterative clustering component is end-to-end trainable, the differentiable simple linear iterative clustering component utilizing soft pixel-superpixel associations.

3. The superpixel sampling network of claim 1, wherein the pixel-superpixel associations are determined by:

$$Q_{pi}^t = e^{-D(I_p, S_i^{t-1})} = e^{-\|I_p - S_i^{t-1}\|^2}$$

wherein:
Q denotes a soft association matrix;
t denotes an iteration;
p denotes a pixel identifier;
i denotes a superpixel identifier;
D denotes a distance between the pixel and the superpixel center;
I denotes an image; and
S denotes a superpixel cluster center location.

4. The superpixel sampling network of claim 1, wherein the updated superpixel centers are determined by:

$$S_i^t = \frac{1}{Z_i^t} \sum_{p=1}^n Q_{pi}^t I_p,$$

wherein:
Q denotes a soft association matrix;
t denotes an iteration;
p denotes a pixel identifier;
i denotes a superpixel identifier;
n denotes a number of pixels in the soft association matrix;
Z denotes a normalization constant;
I denotes an image; and
S denotes a superpixel cluster center location.

5. The superpixel sampling network of claim 1, wherein the final pixel-superpixel associations are converted to spatially-connected pixel-superpixel associations.

6. The superpixel sampling network of claim 1, wherein the differentiable simple linear iterative clustering component utilizes a reconstruction loss function.

7. The superpixel sampling network of claim 1, wherein the differentiable simple linear iterative clustering component utilizes a compactness loss function.

8. The superpixel sampling network of claim 1, wherein the differentiable simple linear iterative clustering component further utilizes a sum of a compactness loss function and a reconstruction loss function.

9. The superpixel sampling network of claim 1, wherein the initial superpixel centers are determined uniformly across the image.

10. The superpixel sampling network of claim 1, wherein the number of iterations is based on convergence of the pixel-superpixel associations of a current iteration with a previous iteration.

11. The superpixel sampling network of claim 1, wherein the differentiable simple linear iterative clustering component further determines small superpixels, the small superpixels below a threshold size, and merges each the small superpixels with a surrounding superpixel, the differentiable simple linear iterative clustering component assigning a different cluster ID for each spatially-connected component.

12. The superpixel sampling network of claim 1, wherein the neural network further comprises:
a first convolution layer to:
receive the image; and
convolve the image into a first convolution layer output;
a second convolution layer to convolve the first convolution layer output into a second convolution layer output;
a first pooling layer to pool the second convolution layer output into a first pooling layer output;
a third convolution layer to convolve the first pooling layer output into a third convolution layer output;
a second pooling layer to pool the third convolution layer output into a second pooling layer output;
a fourth convolution layer to convolve the second pooling layer output into a fourth convolution layer output;
a first bilinear upsampler to upsample the third convolution layer output into a first bilinear upsampler output;
a second bilinear upsampler to upsample the fourth convolution layer output into a second bilinear upsampler output; and
a final convolution layer to:
concatenate the image, the second convolution layer output, the first bilinear upsampler output, and the second bilinear upsampler output; and
generate by convolution the set of pixel features.

13. The superpixel sampling network of claim 2, wherein the differentiable simple linear iterative clustering component further converts the soft pixel-superpixel associations to hard pixel-superpixel associations.

14. The superpixel sampling network of claim 6, wherein the reconstruction loss function is:

$$L_{recon} = \mathcal{L}(R, R^*) = \mathcal{L}(R, \tilde{Q}\hat{Q}^T R)$$

wherein:
$L_{recon}$ denotes the reconstruction loss function;
L denotes a task-specific loss-function;
R denotes pixel properties;
R* denotes a pixel representation;
$\tilde{Q}$ denotes a row-normalized soft association matrix;
$\hat{Q}$ denotes a column-normalized soft association matrix; and
T denotes matrix transposition.

15. The superpixel sampling network of claim 7, wherein the compactness loss function is:

$$L_{compact} = \|I^{XY} - \bar{I}^{XY}\|^2$$

wherein:
$L_{compact}$ denotes the compactness loss function;
$I^{XY}$ denotes positional pixel features; and
$\bar{I}^{-XY}$ denotes an inverse mapping of positional pixel features.

16. The superpixel sampling network of claim 8, wherein the compactness loss function is scaled by a factor of an order of [[10^−5]]10^−5.

17. A superpixel sampling network comprising:
a neural network to input an image and to generate a set of pixel features from the image; and
a differentiable simple linear iterative clustering component coupled to the neural network;
the differentiable simple linear iterative clustering component to determine pixel-superpixel associations from the set of pixel features and initial superpixel centers by:

$$Q_{pi}^t = e^{-D(I_p, S_i^{t-1})} = e^{-\|I_p - S_i^{t-1}\|^2}$$

wherein:
Q denotes a soft association matrix;
t denotes an iteration;
p denotes a pixel identifier;
i denotes a superpixel identifier;
D denotes a distance between a pixel and a superpixel;

I denotes an image location; and

S denotes a superpixel cluster center location;

and to output the image with the pixel-superpixel associations.

18. The superpixel sampling network of claim 17, the differentiable simple linear iterative clustering component to generate updated superpixel centers by:

$$S_i^t = \frac{1}{z_i^t} \sum_{p=1}^{n} Q_{pi}^t I_p,$$

wherein:

n denotes a number of pixels in the soft association matrix; and

Z denotes a normalization constant.

19. The superpixel sampling network of claim 17, wherein the neural network and the differentiable simple linear iterative clustering component are end-to-end trainable.

20. The superpixel sampling network of claim 19, wherein:

the pixel-superpixel associations determined by the differentiable simple linear iterative clustering component are soft pixel-superpixel associations; and the differentiable simple linear iterative clustering component converts the soft pixel-superpixel associations to hard pixel-superpixel associations.

* * * * *